(12) United States Patent
Noro et al.

(10) Patent No.: US 10,982,123 B2
(45) Date of Patent: Apr. 20, 2021

(54) SEALING MATERIAL FOR MULTI-LAYERED GLASSES, AND MULTI-LAYERED GLASS

(71) Applicant: DIC Corporation, Tokyo (JP)

(72) Inventors: Daiki Noro, Ichihara (JP); Hiroshi Yoshimura, Ichihara (JP); Yusuke Tajiri, Ichihara (JP)

(73) Assignee: DIC Corporation, Tokyo (JP)

( * ) Notice: Subject to any disclaimer, the term of this patent is extended or adjusted under 35 U.S.C. 154(b) by 11 days.

(21) Appl. No.: 16/470,895

(22) PCT Filed: Dec. 14, 2017

(86) PCT No.: PCT/JP2017/044866
§ 371 (c)(1),
(2) Date: Sep. 30, 2019

(87) PCT Pub. No.: WO2018/116949
PCT Pub. Date: Jun. 28, 2018

(65) Prior Publication Data
US 2020/0040239 A1 Feb. 6, 2020

(30) Foreign Application Priority Data

Dec. 22, 2016 (JP) .............................. JP2016-248892

(51) Int. Cl.
| | |
|---|---|
| *C09J 181/04* | (2006.01) |
| *C09J 7/10* | (2018.01) |
| *B32B 7/12* | (2006.01) |
| *B32B 17/10* | (2006.01) |
| *C03C 27/10* | (2006.01) |
| *C09K 3/10* | (2006.01) |
| *E06B 3/663* | (2006.01) |

(52) U.S. Cl.
CPC .............. *C09J 181/04* (2013.01); *B32B 7/12* (2013.01); *B32B 17/10036* (2013.01); *B32B 17/10779* (2013.01); *C03C 27/10* (2013.01); *C09J 7/10* (2018.01); *C09K 3/1012* (2013.01); *E06B 3/66333* (2013.01); *B32B 2315/08* (2013.01); *B32B 2367/00* (2013.01); *B32B 2419/00* (2013.01); *C09J 2467/00* (2013.01); *C09J 2481/00* (2013.01); *C09K 2200/0655* (2013.01); *C09K 2200/0682* (2013.01)

(58) Field of Classification Search
CPC .. C09J 181/04; C09J 2481/00; C09J 2467/00; C03C 27/00; B32B 7/12; B32B 17/10036; B32B 17/10779; B32B 2315/08; B32B 2367/00; E06B 3/66333; C09K 2200/0682
See application file for complete search history.

(56) References Cited

U.S. PATENT DOCUMENTS

| | | | | |
|---|---|---|---|---|
| 4,807,419 | A * | 2/1989 | Hodek | E06B 3/677 52/786.1 |
| 2009/0069483 | A1 | 3/2009 | Komatsu et al. | |
| 2016/0251554 | A1* | 9/2016 | Kawami | C09J 11/04 524/296 |

FOREIGN PATENT DOCUMENTS

| | | |
|---|---|---|
| EP | 3075812 A1 | 10/2016 |
| JP | 62-280259 A | 12/1987 |
| JP | 05-017684 A | 1/1993 |
| JP | 05-125280 A | 5/1993 |

(Continued)

OTHER PUBLICATIONS

International Search Report dated Mar. 20, 2018, issued for PCT/JP2017/044866.

*Primary Examiner* — Donald J Loney
(74) *Attorney, Agent, or Firm* — Locke Lord LLP; James E. Armstrong, IV; Nicholas J. DiCeglie, Jr.

(57) ABSTRACT

Provided is a sealing material for multi-layered glasses, including: a polysulfide resin (A) and a polyester resin (B) which is represented by Formula (1-1):

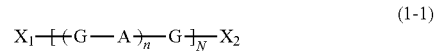

(1-1)

or Formula (1-2):

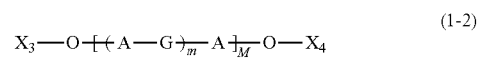

(1-2)

wherein A represents a dibasic acid residue, G represents a diol residue, $X_1$ and $X_2$ represent a hydrogen atom or a group represented by Formula (2-1):

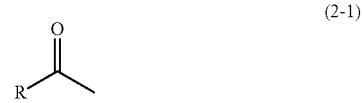

(2-1)

wherein R represents an aromatic group or an aliphatic group, and $X_3$ and $X_4$ represent an aromatic group or an aliphatic group, n and m each represent the average number of repetitions of a repeating unit in parentheses and are each a numerical value larger than 0, and some or all A's are aromatic dibasic acid residues, and which has an aromatic dibasic acid residue content of 20 to 70% based on chemical formula weights calculated from the chemical formulae represented by $[\ ]_N$ and $[\ ]_M$ and also has a number average molecular weight of 400 to 5,000.

10 Claims, No Drawings

(56) References Cited

FOREIGN PATENT DOCUMENTS

| | | |
|---|---|---|
| JP | 2009-084551 A | 4/2009 |
| JP | 2013-118174 A | 6/2013 |
| JP | 2013-227366 A | 11/2013 |
| WO | 2015/079807 A1 | 6/2015 |
| WO | 2015/103460 A1 | 7/2015 |

* cited by examiner

SEALING MATERIAL FOR MULTI-LAYERED GLASSES, AND MULTI-LAYERED GLASS

TECHNICAL FIELD

The present invention relates to a multi-layered glass sealing material having excellent water vapor permeation resistance, gas barrier properties, and adhesion properties, and to a multi-layered glass produced using such a sealing material.

BACKGROUND ART

It is said that, for a typical house, the amount of heat dissipation through a glass window is 20 to 30%. Conventionally, to reduce the amount of heat dissipation through a glass window, a multi-layered glass which has enhanced heat insulation property of a glass window according to overlay of plural plate glasses is used.

A multi-layered glass is produced by, for example, a method in which at least two glass plates opposed to each other are spaced apart via a spacer like an aluminum material, each lateral surface of the spacer opposed to those two glass plates that are spaced apart is adhered to the two glass plates by using a primary sealing material to form a hollow layer between the two glass plates, and then the outer side of the primary sealing material is sealed by a secondary sealing material. This method is referred to as a dual sealing method, and it is widely employed.

The intermediate layer between the two glass plates is generally filled with dry air. However, there is also a multi-layered glass having enhanced heat insulation property of a multi-layered glass according to filling of inert gas such as nitrogen, argon, xenon, krypton, or sulfur hexafluoride.

As for the primary sealing material used for the above dual sealing method, a resin composition having polyisobutylene as a main component is known. Furthermore, as for the secondary sealing material, a composition of ordinary temperature curable resin such as a composition having polysulfide resin as a main component, a composition having polyurethane resin as a main component, or a composition having silicone resin as a main component, or the like is used. Among them, for the purpose of preventing the infiltration of air or water from outside to the intermediate layer between the two glass plates, a composition having polysulfide resin as a main component, which has an excellent low water permeation property (water vapor permeation resistance) and an excellent low gas permeation property (gas barrier property), is often used (polysulfide resin-based sealing material).

As a plasticizer used for the above polysulfide resin-based sealing material, a phthalic acid diester-based plasticizer like butyl benzyl phthalate (BBP); a hydrocarbon-based plasticizer like chlorinated paraffin, alkylene triphenyl; dibutyl adipate, dibutyl diglycol adipate, or the like are conventionally known.

In addition to the above plasticizers, also known is a polyester-based plasticizer obtained by condensation of polysulfide resin with adipic acid, alkylene glycol, and benzene monocarboxylic acid as a plasticizer having excellent low-temperature compatibility and also low viscosity (see, PTL 1, for example). Specifically, a polyester-based plasticizer obtained by condensation of adipic acid, propylene glycol, and benzoic acid is known.

Furthermore, as a polyester-based plasticizer which is excellent in terms of low volatility and low bleeding property, a polyester-based plasticizer obtained by using adipic acid, propylene glycol, and benzoic acid and having a weight average molecular weight of 500 to 5,000 is known (see, PTL 2, for example).

In recent years, it is required for a multi-layered glass to have even higher heat insulation property and maintain the heat insulation property for a long period of time, and, accordingly, a secondary sealing material which has an excellent gas barrier property and water vapor permeation resistance is needed to have the higher heat insulation property and maintain the heat insulation property for a long period of time. In addition, to maintain the heat insulation property for a long period of time, leakage of dry air or inert gas from a gap between a glass and a sealing material needs to be prevented so that a good adhesion property between a multi-layered glass and a secondary sealing material is also necessary. Thus, the secondary sealing material is required to have a higher gas barrier property, a higher water vapor permeation resistance, and a higher adhesion property to a glass compared to a polysulfide resin-based sealing material that is obtained by using the polyester-based plasticizer described in the aforementioned PTL 1 or PTL 2.

CITATION LIST

Patent Literature

PTL 1: JP-A-5-017684
PTL 2: International Publication WO2015/103460

SUMMARY OF INVENTION

Technical Problem

A problem to be solved by the present invention is to provide a multi-layered glass sealing material having excellent water vapor permeation resistance, gas barrier properties, and adhesion properties, and to provide a multi-layered glass produced using such a sealing material.

Solution to Problem

As a result of extensive studies, the inventors have found that a cured product of a polysulfide resin composition produced using a polyester resin containing, as a plasticizer, an aromatic group derived from an aromatic dibasic acid at a concentration in a specific range and having a weight average molecular weight of 400 to 5,000 has excellent water vapor permeation resistance, excellent gas barrier properties, and excellent adhesion properties to glass and is suitable for use in a sealing material for a multi-layered glass, and thus completed the present invention.

Specifically, the present invention provides a sealing material for a multi-layered glass, including: a polysulfide resin (A); and a polyester resin (B) which is a polyester resin represented by General Formula (1-1):

[Chem. 1]

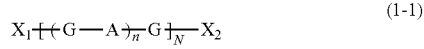

(1-1)

wherein A represents a dibasic acid residue, G represents a diol residue, n represents the average number of repetitions of a repeating unit in parentheses and is a numerical value larger than 0, A and G may be the same or different between repeating units each in the parentheses, $X_1$ and $X_2$ independently represent a hydrogen atom or a group represented by General Formula (2-1):

[Chem. 2]

(2-1)

wherein R represents an aromatic group or an aliphatic group, some or all of A's are aromatic dibasic acid residues, and which has an aromatic dibasic acid residue content of 20 to 70% on the basis of a chemical formula weight calculated from the chemical formula represented by [ ]$_N$ in General Formula (1-1), and also has a number average molecular weight (Mn) of 400 to 5,000, or a polyester resin (B) which is represented by General Formula (1-2):

[Chem. 3]

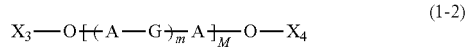
(1-2)

wherein A represents a dibasic acid residue, G represents a diol residue, m represents the average number of repetitions of a repeating unit in parentheses and is a numerical value larger than 0, A and G may be the same or different between repeating units each in parentheses, $X_3$ and $X_4$ independently represent an aromatic group or an aliphatic group, and some or all of A's are aromatic dibasic acid residues, and which has an aromatic dibasic acid residue content of 20 to 70% on the basis of a chemical formula weight calculated from the chemical formula represented by [ ]$_M$ in General Formula (1-2), and also has a number average molecular weight (Mn) of 400 to 5,000.

Furthermore, the present invention also provides a multi-layered glass including: at least two glass plates opposed to each other and spaced apart via a spacer; a primary sealing material with which each lateral surface of the spacer opposed to the two glass plates is bonded to each of the two glass plates so that a hollow layer is formed between the two glass plates; and a cured product of a secondary sealing material with which an outer side of the primary sealing material is sealed, the secondary sealing material including: a polysulfide resin (A); and a polyester resin (B) which is a polyester resin represented by General Formula (1-1):

[Chem. 4]

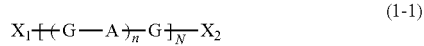
(1-1)

wherein A represents a dibasic acid residue, G represents a diol residue, n represents the average number of repetitions of a repeating unit in parentheses and is a numerical value larger than 0, A and G may be the same or different between repeating units each in the parentheses, $X_1$ and $X_2$ independently represent a hydrogen atom or a group represented by General Formula (2-1):

[Chem. 5]

(2-1)

wherein R represents an aromatic group or an aliphatic group, some or all of A's are aromatic dibasic acid residues, and which has an aromatic dibasic acid residue content of 20 to 70% on the basis of a chemical formula weight calculated from the chemical formula represented by [ ]$_N$ in General Formula (1-1), and also has a number average molecular weight (Mn) of 400 to 5,000, or a polyester resin (B) which is represented by General Formula (1-2):

[Chem. 6]

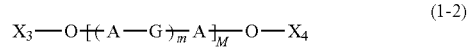
(1-2)

wherein A represents a dibasic acid residue, G represents a diol residue, m represents the average number of repetitions of a repeating unit in parentheses and is a numerical value larger than 0, A and G may be the same or different between repeating units each in the parentheses, $X_3$ and $X_4$ independently represent an aromatic group or an aliphatic group, some or all of A's are aromatic dibasic acid residues, and which has an aromatic dibasic acid residue content of 20 to 70% on the basis of a chemical formula weight calculated from the chemical formula represented by [ ]$_N$ in General Formula (1-2), and also has a number average molecular weight (Mn) of 400 to 5,000.

Advantageous Effects of Invention

According to the present invention, a sealing material for multi-layered glasses, which allows obtainment of a cured product having excellent water vapor permeation resistance, gas barrier property, and excellent adhesion property to glass, and a multi-layered glass using the sealing material can be provided.

DESCRIPTION OF EMBODIMENTS

The polysulfide resin (A) used in the present invention is not particularly limited as long as it is a resin having sulfide bond in the molecule. The polysulfide resin (A) is not particularly limited in terms of the skeleton thereof. For example, those having a hydrocarbon group like alkyl group bonded to a sulfide bond can be mentioned. The polysulfide resin (A) may also contain, in the skeleton, an ether bond, an ester bond, an amide bond, or an imide group, for example.

When the polysulfide resin (A) has an ether bond in the skeleton, it becomes a polysulfide polyether resin. The polysulfide resin (A) may also contain, at the single terminal or both terminals, a functional group such as thiol group, hydroxyl group, or amino group.

As for the polysulfide resin (A) used in the present invention, those containing a structural unit represented by —($C_2H_4OCH_2OC_2H_4$—SX)— (x is an integer of 1 to 5) in the main chain and also having a thiol group represented by —$C_2H_4OCH_2OC_2H_4$—SH at the terminal can be mentioned, for example.

As for the polysulfide resin (A) used in the present invention, those having fluidity at room temperature, specifically 25° C., is preferable. The number average molecular weight (Mn) of the polysulfide resin (A) is typically 100 to 200,000, and preferably 400 to 50,000 or less.

Furthermore, as for the polysulfide resin (A) used in the present invention, a polysulfide polyether resin can be also mentioned. Specifically, as for the polysulfide polyether resin, a polysulfide polyether resin containing a thiol group can be mentioned, and examples thereof include those containing, in the main chain, a polyether moiety represented by (1) "—$(R_1O)_n$—" ($R_1$ represents an alkylene group having 2 to 4 carbon atoms, and n represents an integer of 6 to 200) and a structural unit represented by (2) "—$C_2H_4OCH_2OC_2H_4$-Sx-" and (3) "—$CH_2CH(OH)CH_2$-Sx-" (x is an integer of 1 to 5) and also having, at the terminal, a thiol group represented by (4) "—$C_2H_4OCH_2OC_2H_4$—SH" or "—$CH_2CH(OH)CH_2$—SH".

Among the polysulfide polyether resins, the polyether moiety of the above (1), the structural unit represented by the above (2), and the structural unit represented by the above (3) can be bonded to one another in arbitrary arrangement. Furthermore, with regard to their ratio, a resin in which $(R_1O)_n$ component is 2% by mass to 95% by mass, ($C_2H_4OCH_2OC_2H_4$Sx) component is 3% by mass to 70% by mass, and ($CH_2CH(OH)CH_2$Sx) component is 1% by mass to 50% by mass can be exemplified.

The number average molecular weight of the polysulfide polyether resin is typically 600 to 200,000, and preferably 800 to 50,000.

In the present invention, the number average molecular weight (Mn) and the weight average molecular weight (Mw) are values determined in terms of polystyrene on the basis of gel permeation chromatography (hereinbelow, abbreviated as "GPC"). Incidentally, the measurement conditions for GPC are as follows.

[Conditions for GPC Measurement]

Measurement apparatus: High-speed GPC apparatus "HLC-8320GPC" manufactured by Tosoh Corporation Column: "TSK GURDCOLUMN Super HZ-L" manufactured by Tosoh Corporation+"TSK gel Super HZM-M" manufactured by Tosoh Corporation+"TSK gel Super HZM-M" manufactured by Tosoh Corporation+"TSK gel Super HZ-2000" manufactured by Tosoh Corporation+"TSK gel Super HZ-2000" manufactured by Tosoh Corporation Detector: RI (Differential refractometer)

Data processing: "EcoSEC Data Analysis version 107" manufactured by Tosoh Corporation Measurement conditions Column temperature: 40° C.

Solvent for elution: tetrahydrofuran (THF)

Flow rate: 0.35 ml/min

Measurement sample: A measurement sample is prepared by dissolving 15 mg of a sample in 10 ml of tetrahydrofuran and filtering the obtained solution through a microfilter Amount of sample injected: 20 μl Reference samples: The following mono-dispersed polystyrenes having known molecular weights were used in accordance with the measurement manual of "HLC-8320GPC" described above.

(Mono-dispersed polystyrene)

"A-300" manufactured by Tosoh Corporation
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation
"F-288" manufactured by Tosoh Corporation The polysulfide resin (A) used in the present invention is not limited in terms of a production method, and those prepared by various known methods may be used. Furthermore, a commercially available product may be also used as the polysulfide resin (A). Examples of the commercially available product of the polysulfide resin (A) include "THIOKOL LP-23, LP-32" (manufactured by Toray Fine Chemicals Co., Ltd.) and "THIOPLAST Polymer" (manufactured by AKZO NOBEL). The polysulfide resin (A) may be used either singly or in combination of two or more kinds thereof.

The polyester resin (B) used in the present invention is a polyester resin which is represented by General Formula (1-1):

[Chem. 7]

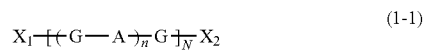

(1-1)

wherein A represents a dibasic acid residue, G represents a diol residue, n represents the average number of repetitions of a repeating unit in parentheses and is a numerical value larger than 0, A and G may be the same or different between repeating units each in the parentheses, $X_1$ and $X_2$ independently represent a hydrogen atom or a group represented by General Formula (2-1):

[Chem. 8]

(2-1)

wherein R represents an aromatic group or an aliphatic group, some or all of A's are aromatic dibasic acid residues, and the content of the aromatic dibasic acid residues is 20 to 70% on the basis of a chemical formula weight calculated from the chemical formula represented by [ ]$_N$ in General Formula (1-1), and which has a number average molecular weight (Mn) of 400 to 5,000 (hereinafter, it may also be abbreviated as "polyester resin (B1)"), or a polyester resin which is represented by General Formula (1-2):

[Chem. 9]

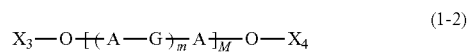

(1-2)

wherein A represents a dibasic acid residue, G represents a diol residue, m represents the average number of repetitions of a repeating unit in parentheses and is a numerical value larger than 0, A and G may be the same or different between repeating units each in the parentheses, $X_3$ and $X_4$ independently represent an aromatic group or an aliphatic group, some or all of A's are aromatic dibasic acid residues, and the content of the aromatic dibasic acid residues is 20 to 70% on the basis of a chemical formula weight calculated from the chemical formula represented by [ ]$_M$ in General Formula (1-2), and which has a number average molecular weight (Mn) of 400 to 5,000 (hereinafter, it may also be abbreviated as "polyester resin (B2)").

When the content of the aromatic dibasic acid residues in General Formula (1-1) and the content of the aromatic dibasic acid residues in General Formula (1-2) are less than 20%, it is difficult to obtain a sealing material for multi-layered glasses having excellent gas barrier property, and thus not preferable. Furthermore, when the content is higher than 70%, high viscosity is yielded so that it is difficult to obtain a sealing material for multi-layered glasses having excellent workability, and thus not preferable. The content is preferably 30 to 70%, and more preferably 50 to 70%.

In the present invention, the content of the aromatic dibasic acid residue in the polyester resin represented by General Formula (1-1) and General Formula (1-2) is obtained according to the following steps.

Step 1: Using pyrolysis GC-MS, MALDI/TOFMS, and NMR, each component (A, G, and $X_1$ to $X_4$) forming the polyester resin (B) represented by General Formula (1-1) and General Formula (1-2) is determined, and the molar ratio of each component is determined.

Step 2: From the molar ratio of each component obtained in the Step 1, the average repetition number n in General Formula (1-1) and the average repetition number m in General Formula (1-2) are calculated.

Step 3: The chemical formula weight of the aromatic dibasic acid residue, the chemical formula weight for the chemical formula represented by [ ]$_N$ in General Formula (1-1), or the chemical formula weight for the chemical formula represented by [ ]$_M$ in General Formula (1-2) is calculated based on the molar ratio of each component and the average repetition number n or the average repetition number m obtained in the Step 1 and Step 2.

Step 4: The content of the aromatic dibasic acid residues is calculated by substituting, for the following formula, the chemical formula weights obtained in the Step 3.

The content of aromatic dibasic acid residues (%)= [(the chemical formula weight of aromatic dibasic acid residues)×100]/(the chemical formula weight calculated from the chemical formula represented by [ ]$_N$ or [ ]$_M$)

It is necessary for the polyester resin (B1) and the polyester resin (B2) to have number average molecular weight (Mn) of 400 to 5,000. When the number average molecular weight is less than 400, it is difficult to obtain a sealing material for multi-layered glasses having excellent gas barrier property, and thus not preferable. Furthermore, when the number average molecular weight is more than 5,000, high viscosity is yielded so that it is difficult to obtain a sealing material for multi-layered glasses having excellent workability, and thus not preferable. The number average molecular weight is preferably 400 to 3,500, and more preferably 400 to 2,500.

Each of n in General Formula (1-1) and m in General Formula (1-2) represents a numerical value larger than 0. From the viewpoint of obtaining a sealing material for multi-layered glasses which has excellent water vapor resistance, gas barrier property, and adhesion property and also good workability, n and m are preferably 0.5 to 25.0, and more preferably 0.5 to 12.0.

In general, the polyester resin (B1) and the polyester resin (B2) are a mixture of resins having various n and m. In the present invention, n and m indicate a mean of each value in the polyester resin as a mixture.

A in the polyester resin (B1) and the polyester resin (B2), which are used in the present invention, represents a dibasic acid residue. Examples of the dibasic acid residue include an aromatic dibasic acid residue and an aliphatic dibasic acid residue.

Examples of the aromatic dibasic acid residue include a phthalic acid residue, a terephthalic acid residue, an isophthalic acid residue, a 1,5-naphthalene dicarboxylic acid residue, a 1,4-naphthalene dicarboxylic acid residue, a biphenyldicarboxylic acid residue, a terephthalic acid dialkyl ester residue, a naphthalene dicarboxylic acid dialkyl ester residue, and a biphenyldicarboxylic acid dialkyl ester residue.

Examples of the aliphatic dibasic acid residue include a malonic acid residue, a succinic acid residue, a glutaric acid residue, an adipic acid residue, a maleic acid residue, a fumaric acid residue, an azelaic acid residue, a sebacic acid residue, and a cyclohexane dicarboxylic acid residue.

As described in the above, the content of the aromatic dibasic acid residue in the polyester resin (B1) is 20 to 70% based on a chemical formula weight calculated from the chemical formula which is represented by [ ]$_N$ in General Formula (1-1). Furthermore, the content of the aromatic dibasic acid residue in the polyester resin (B2) is 20 to 70% based on a chemical formula weight calculated from the chemical formula which is represented by [ ]$_M$ in General Formula (1-2). The content of the aromatic dibasic acid residue is preferably within this range, and it is also possible to contain an aliphatic dibasic acid residue. From the viewpoint of obtaining a sealing material for multi-layered glasses having excellent gas barrier property, it is preferable that the entire amount of the dibasic acid residue of A is an aromatic dibasic acid residue.

A in the polyester resin (B1) and the polyester resin (B2) is, from the viewpoint of obtaining a sealing material for multi-layered glasses which allows obtainment of a cured product with excellent gas barrier property and also has easy handlability and excellent workability, preferably an aromatic dibasic acid residue with 8 to 14 carbon atoms, and it is more preferably a phthalic acid residue, a terephthalic acid residue, or an isophthalic acid residue.

In the present invention, the term "dibasic acid residue" indicates an organic group remained after removing "OH" from the two carboxyl groups contained in the dibasic acid. Furthermore, in a case in which the "dibasic acid residue" is a "dibasic acid alkyl ester residue", it indicates an organic group remained after removing "alkyl group and oxygen atom directly bonded to the alkyl group" from the two alkyl ester groups contained in the dibasic acid alkyl ester.

G in the polyester resin (B1) and the polyester resin (B2) represents a diol residue. Examples of the diol residue include an aromatic diol residue (diol residue having an aromatic ring) and an aliphatic diol residue.

Examples of the aromatic diol residue include a bisphenol A residue, and an ethylene oxide adduct residue and a propylene oxide adduct residue of bisphenol A.

Examples of the aliphatic diol residue include an ethylene glycol residue, a 1,2-propane diol residue (propylene glycol residue), 1,3-propane diol residue, a 1,2-butane diol residue, a 1,3-butane diol residue, a 1,4-butane diol residue, a 1,5-pentane diol residue, a 1,6-hexane diol residue, a 1,7-heptane diol residue, a 1,8-octane diol residue, a 1,9-nonane diol residue, a 1,10-decane diol residue, a 1,11-undecane diol residue, a 1,12-dodecane diol residue, a 1,4-cyclohexanedimethanol residue, a neopentyl glycol residue, a 3,3-diethyl-1,3-propane diol residue, a 3,3-dibutyl-1,3-propane diol residue, a 1,2-pentane diol residue, a 1,3-pentane diol residue, a 2,3-pentane diol residue, a 2,4-pentane diol residue, a 2-methyl-2,4-pentane diol residue, a 3-methyl-1,5-pentane diol residue, a 1,4-pentane diol residue, a 1,2-hexane diol residue, a 1,3-hexane diol residue, a 1,4-hexane diol residue, a 1,5-hexane diol residue, a n-butoxyethylene glycol residue, a cyclohexane dimethanol residue, a hydrogenated bisphenol A residue, a dimer diol residue, a diethylene glycol residue, a dipropylene glycol residue, a triethylene glycol residue, a polyethylene glycol residue, a polypropylene glycol residue, a polytetramethylene glycol residue, and a hexylene glycol residue. The polyester resin (B1) and the polyester resin (B2) may have only one type or plural types of those diol residues.

G in the polyester resin (B1) and the polyester resin (B2) is, from the viewpoint of obtaining a sealing material for multi-layered glasses having excellent gas barrier property, preferably a diol residue with 2 to 8 carbon atoms, and it is more preferably an aliphatic diol residue with 2 to 8 carbon atoms, and even more preferably an ethylene glycol residue, a propylene glycol residue, or a 3-methyl pentane diol residue.

In the present invention, the term "diol residue" indicates an organic group remained after removing a hydrogen atom from the two hydroxyl groups contained in diol.

Each of $X_1$ and $X_2$ in General Formula (1-1) is a hydrogen atom or a group represented by General Formula (2-1):

[Chem. 10]

(2-1)

In the formula, R represents an aromatic group or an aliphatic group).

Examples of the aromatic group as R in General Formula (2-1) include a phenyl group, a dimethylphenyl group, a trimethylphenyl group, a tetramethylphenyl group, an ethylphenyl group, a propylphenyl group, a para toluyl group, a meta toluyl group, an ortho toluyl group, a methoxyphenyl group, an ethoxyphenyl group, a propoxyphenyl group, a cyanophenyl group, a fluorophenyl group, a nitrophenyl group, a phenylphenyl group, a methylphenylphenyl group, a dimethylphenylphenyl group, and a naphthyl group.

Examples of the aliphatic group as R in General Formula (2-1) include a methyl group, an ethyl group, a propyl group, and a butyl group.

From the viewpoint of obtaining a sealing material for multi-layered glasses with excellent gas barrier property, $X_1$ and $X_2$ are preferably a hydrogen atom or a group represented by the following General Formula (2-1) in which R is an aromatic group. Among the aromatic groups, a phenyl group and a methylphenyl group are more preferable. $X_1$ and $X_2$ may be the same or different from each other.

Each of $X_3$ and $X_4$ in General Formula (1-2) is an aromatic group or an aliphatic group. As for the aromatic group and aliphatic group, those mentioned as R in General Formula (2-1) can be exemplified, for example. From the viewpoint of obtaining a sealing material for multi-layered glasses with excellent compatibility with the polysulfide resin (A) and also excellent gas barrier property, $X_3$ and $X_4$ are preferably an aliphatic group with 1 to 5 carbon atoms, and, in particular, they are more preferably a methyl group or an ethyl group.

Among the polyester resin (B) used in the present invention, from the viewpoint of obtaining a sealing material for multi-layered glasses with excellent compatibility with the polysulfide resin (A) and also excellent gas barrier property, the polyester resin (B1) represented by General Formula (1-1) is more preferable.

The polyester resin (B1) in which each of $X_1$ and $X_2$ is a hydrogen atom may be obtained by the following method, for example.

Method (B1-1): A method of reacting a dibasic acid for forming A in General Formula (1-1) with a diol for forming G under conditions where the hydroxyl equivalent is larger than the carboxyl equivalent.

The polyester resin (B1) in which $X_1$ or $X_2$ is a group represented by General Formula (2-1) may be obtained by the following method, for example.

Method (B1-2): A method of adding in a batch manner a dibasic acid for forming A and a diol for forming G in General Formula (1-1) and a monocarboxylic acid for forming the group represented by General Formula (2-1) and reacting them.

Method (B1-3): A method of reacting a dibasic acid for forming A in General Formula (1-1) with a diol for forming G under conditions where the hydroxyl equivalent is larger than the carboxyl equivalent to obtain a polyester resin having a hydroxyl group at the terminal of the main chain, and then reacting the polyester resin with a monocarboxylic acid for forming the group represented by General Formula (2-1).

The polyester resin (B2) may be obtained by the following method, for example.

Method (B2-1): A method of adding in a batch manner a dibasic acid for forming A in General Formula (1-2), a diol for forming G, and an aromatic monoalcohol or an aliphatic monoalcohol and reacting them.

Method (B2-2): A method of reacting a dibasic acid for forming A in General Formula (1-2) with a diol for forming G under conditions where the carboxyl equivalent is larger than the hydroxyl equivalent to obtain a polyester resin having a carboxyl group at the terminal of the main chain, and then reacting the polyester resin with an aromatic monoalcohol or an aliphatic monoalcohol.

Examples of the dibasic acid for forming A include an aromatic dibasic acid and an aliphatic dibasic acid.

Examples of the aromatic dibasic acid include phthalic acid, terephthalic acid, isophthalic acid, 1,5 naphthalene dicarboxylic acid, 1,4 naphthalene dicarboxylic acid, biphenyldicarboxylic acid, terephthalic acid dialkyl ester, naphthalene dicarboxylic acid dialkyl ester, and biphenyldicarboxylic acid dialkyl ester.

Examples of the aliphatic dibasic acid include malonic acid, succinic acid, glutaric acid, adipic acid, maleic acid, fumaric acid, azelaic acid, sebacic acid, and cyclohexane dicarboxylic acid.

As described in the above, the content of the aromatic dibasic acid residue in the polyester resin (B1) is 20 to 70% based on a chemical formula weight calculated from the chemical formula which is represented by [ ]$_N$ in General Formula (1-1). Furthermore, the content of the aromatic dibasic acid residue in the polyester resin (B2) is 20 to 70% based on a chemical formula weight calculated from the chemical formula which is represented by [ ]$_M$ in General Formula (1-2). The content of the aromatic dibasic acid residue is preferably within this range, and, for obtaining the polyester resin (B1) or the polyester resin (B2), it is possible to use an aliphatic dibasic acid in combination with the aromatic dibasic acid. However, from the viewpoint of obtaining a sealing material for multi-layered glasses having excellent gas barrier property, it is preferable that the entire amount of the dibasic acid is an aromatic dibasic acid. Furthermore, the dibasic acid forming the A may be used either singly or in combination of two or more kinds thereof.

The aromatic dibasic acid is, from the viewpoint of obtaining a sealing material for multi-layered glasses which allows obtainment of a cured product with excellent gas barrier property and also has easy handlability and excellent workability, preferably an aromatic dibasic acid with 8 to 14 carbon atoms, and it is more preferably phthalic acid, terephthalic acid, or isophthalic acid.

Examples of the diol for forming G include an aromatic diol and an aliphatic diol.

Examples of the aromatic diol include bisphenol A, and an ethylene oxide adduct and a propylene oxide adduct of bisphenol A.

Examples of the aliphatic diol include ethylene glycol, 1,2-propane diol(propylene glycol), 1,3-propane diol, 1,2-butane diol, 1,3-butane diol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,4-cyclohexanedimethanol, neopentyl glycol, 3,3-diethyl-1,3-propane diol, 3,3-dibutyl-1,3-propane diol, 1,2-pentane diol, 1,3-pentane diol, 2,3-pentane diol, 2,4-pentane diol, 2-methyl-2,4-pentane diol, 3-methyl-1,5-pentane diol, 1,4-pentane diol, 1,2-hexane diol, 1,3-hexane diol, 1,4-hexane diol, 1,5-hexane diol, n-butoxyethylene glycol, cyclohexane dimethanol, hydrogenated bisphenol A, dimer diol, diethylene glycol, dipropylene glycol, triethylene glycol, polyethylene glycol, polypropylene glycol, polytetramethylene glycol, and hexylene glycol. The diol may be used either singly or in combination of two or more kinds thereof.

The diol is, from the viewpoint of obtaining a sealing material for multi-layered glasses with excellent gas barrier property, preferably diol with 2 to 8 carbon atoms, and it is more preferably aliphatic diol with 2 to 8 carbon atoms and even more preferably ethylene glycol, propylene glycol, or 3-methylpentane diol.

Examples of the monocarboxylic acid forming a group represented by General Formula (2-1) include aromatic monocarboxylic acid and aliphatic monocarboxylic acid.

Examples of the aromatic monocarboxylic acid include benzoic acid, dimethyl benzoic acid, trimethyl benzoic acid, tetramethyl benzoic acid, ethyl benzoic acid, propyl benzoic acid, butyl benzoic acid, cumic acid, para tertiary butyl benzoic acid, ortho toluic acid, meta toluic acid, para toluic acid, ethoxybenzoic acid, propoxybenzoic acid, naphthoic acid, anisic acid, and a methyl ester and an acid chloride thereof.

Examples of the aliphatic monocarboxylic acid include acetic acid, propionic acid, butanoic acid, hexanoic acid, and cyclohexane carboxylic acid. They may be used either singly or in combination of two or more kinds thereof.

Among the monocarboxylic acids, from the viewpoint of obtaining a sealing material for multi-layered glasses with excellent gas barrier property, aromatic monocarboxylic acid is preferable, and benzoic acid and toluic acid are more preferable.

Examples of the aromatic monoalcohol include phenol, ethyl phenol, isobutyl phenol, pentyl phenol, octyl phenol, dodecyl phenol, tetradecyl phenol, and benzyl alcohol. Examples of the aliphatic monoalcohol include methanol, ethanol, propanol, butanol, heptanol, hexanol, cyclohexanol, heptanol, octanol, nonanol, decanol, undecanol, and dodecanol. Among the monoalcohols, from the viewpoint of obtaining a sealing material for multi-layered glasses with excellent compatibility with the polysulfide resin (A) and also excellent gas barrier property, aliphatic alcohol with 1 to 5 carbon atoms is preferable, and, in particular, methanol or ethanol is more preferable.

The polyester resin (B) used in the present invention may be produced by subjecting the aforementioned raw materials to an esterification reaction, for example, in a temperature range of 180 to 250° C. for 10 to 25 hours, for example, in the presence of a catalyst for esterification, if necessary. Incidentally, the conditions such as temperature and time for the esterification reaction are not particularly limited, and they can be suitably set.

Examples of the catalyst for esterification include a titanium-based catalyst such as tetraisopropyl titanate or tetrabutyl titanate; a tin-based catalyst such as dibutyl tin oxide; and an organic sulfonic acid-based catalyst such as p-toluene sulfonic acid.

Use amount of the catalyst for esterification can be suitably set. However, it is generally preferable to be used within a range of 0.001 to 0.1 parts by mass relative to 100 parts by mass of the total amount of the raw materials.

Physical state of the polyester resin (B) used in the present invention is, although it may vary depending on factors like number average molecular weight, composition, or the like, generally liquid, solid, paste phase, or the like at ordinary temperature.

The content of the polyester resin (B) in the sealing material of the prevent invention for multi-layered glasses is, from the viewpoint that bleed-out of the polyester resin (B) from a cured product does not occur and, as a result, a sealing material for multi-layered glasses having excellent adhesion property to glass and excellent gas barrier property is obtained preferably 1 to 80 parts by mass, and more preferably 10 to 40 parts by mass relative to 100 parts by mass of the polysulfide resin (A).

The sealing material of the present invention for multi-layered glasses may contain various types of additives other than the polysulfide resin (A) and the polyester resin (B) within a range in which the effect of the present invention is not negatively affected by them. Examples of those various types of additives include a filler, a plasticizer, a tackifying agent, a pigment, a dye, an anti-aging agent, an anti-oxidizing agent, an anti-static agent, a flame retardant, a tackifying resin, a stabilizer, and a dispersant. Each additive may be used either singly or two or more kinds of the additives may be used in combination.

Examples of the filler include organic or inorganic fillers in various shapes. Specific examples thereof include an organic or inorganic filler such as agalmatolite clay, kaolin clay, calcined clay, silica sand, fumed silica, calcined silica, precipitated silica, pulverized silica, molten silica, diatomaceous earth, calcium carbonate, iron oxide, zinc oxide, titanium oxide, barium oxide, magnesium oxide; magnesium carbonate, zinc carbonate, or carbon black, and their processed products with fatty acid, resin acid, or fatty acid ester and their processed products with fatty acid ester urethane compound.

As for the plasticizer, a plasticizer other than the polyester resin (B) of the present invention can be mentioned, for example, and specific examples thereof include a phthalic acid-based plasticizer such as diisononyl phthalate (DINP), dioctyl phthalate (DOP), dibutyl phthalate (DBP), butyl benzyl phthalate (BBP), or alkyl (carbon atom number of 7 to 9) benzyl phthalate; a benzoate-based plasticizer such as diethylene glycol dibenzoate or dipropylene glycol; a phosphoric acid ester-based plasticizer such as tricresyl phosphoric acid or trioctyl phosphoric acid; an adipic acid-based plasticizer such as dioctyl adipic acid; a polyester-based plasticizer such as propylene glycol adipic acid polyester or butylene glycol adipic acid polyester; and polypropylene glycol, isodecyl succinic acid, pentaerythritol ester, butyl oleic acid, methylacetyl ricinoleic acid, alkylsulfonic acid phenyl ester (for example, MESAMOLL manufactured by Bayer), and chlorinated paraffin.

Among the plasticizers, from the viewpoint of obtaining a homogeneously mixed multi-layered glass sealing material, adding a benzoate-based plasticizer to the sealing material of the present invention for multi-layered glasses is preferable. In a case in which the benzoate-based plasticizer is added to the sealing material of the present invention for multi-layered glasses, the mixing amount is preferably 10 to 200 parts by mass, and more preferably 10 to 100 parts by mass relative to 100 parts by mass of the polyester resin (B).

As for the tackifying agent, a silane coupling agent such as aminosilane can be preferably mentioned from the viewpoint that it has an excellent effect of enhancing the adhesiveness, particularly, to glass and also it is a compound for universal use. Examples of the aminosilane include 3-aminopropyltrimethoxysilane, 3-aminopropyltriethoxysilane, 3-aminopropylmethyldimethoxysilane, 3-aminopropylethyldiethoxysilane, bistrimethoxysilylpropylamine, bistriethoxysilylpropylamine, bismethoxydimethoxysilylpropylamine, bisethoxydiethoxysilylpropylamine, N-2-(aminoethyl)-3-aminopropyltrimethoxysilane, N-2-(aminoethyl)-3-aminopropylmethyldimethoxysilane, N-2-(aminoethyl)-3-aminopropyltriethoxysilane, and N-2-(aminoethyl)-3-aminopropylethyldiethoxysilane.

Examples of the pigment include an inorganic pigment such as titanium oxide, zinc oxide, ultramarine, bengala, lithophone, lead, cadmium, iron, cobalt, aluminum, hydrochloric acid salt, or sulfuric acid salt; and an organic pigment such as azo pigment or copper phthalocyanine pigment.

Examples of the dye include a black dye, a yellow dye, a red dye, a blue dye, and a brown dye.

Examples of the anti-aging agent include a hindered phenol-based compound and a hindered amine-based compound.

Examples of the anti-oxidizing agent include butylhydroxytoluene (BHT) and butylhydroxyanisole (BHA).

Examples of the anti-static agent include quaternary ammonium salt; and a hydrophilic compound such as polyglycol or ethylene oxide derivatives.

Examples of the flame retardant include chloroalkyl phosphate, dimethyl.methyl phosphonate, brome.phosphorus compound, ammonium polyphosphate, neopentyl bromide-polyether, and brominated polyether.

Examples of the tackifying resin include a terpene resin, a phenol resin, a terpene-phenol resin, a rosin resin, a xylene resin, an epoxy resin, alkyl titanates, and organic polyisocyanate.

Examples of the stabilizer include fatty acid silyl ester and a fatty acid amide trimethylsilyl compound.

The dispersant indicates a material which disperses a solid in liquid by having the solid in form of a fine particle, and examples of the dispersant include sodium hexametaphosphoric acid, sodium salt of naphthalene sulfonic acid condensation product, and a surfactant.

The method for producing the sealing material of the present invention for multi-layered glasses is not particularly limited. For example, the sealing material of the present invention for multi-layered glasses may be produced by a method in which the aforementioned each component is mixed by sufficient kneading, homogeneous dispersing or the like under reduced pressure or inert gas environment such as nitrogen by using a stirring device such as roll, kneader, extruder, universal stirrer, or blending mixer.

The sealing material of the present invention for multi-layered glasses is generally used by mixing with a curing agent immediately before use. As for the curing agent, a curing agent generally used for a polysulfide resin-based sealing material such as metal oxide, metal peroxide, an organic or inorganic oxidizing agent, an epoxy compound, or an isocyanate compound may be used. Among them, metal peroxide such as lead dioxide or manganese dioxide is preferable, and manganese dioxide is more preferable.

In a case in which manganese dioxide is used as the curing agent, the use amount is, from the viewpoint of having sufficient curing and obtaining a cured product with suitable elasticity, preferably 2.5 to 25 parts by mass, and more preferably 3 to 20 parts by weight relative to 100 parts by mass of the polysulfide resin (A) in the sealing material of the present invention for multi-layered glasses, which is used as a main agent.

A filler, a plasticizer, and a curing promoter may be also contained in the curing agent.

Examples of the filler include carbon black, non-treated heavy calcium carbonate, fatty acid-treated heavy calcium carbonate, fatty acid-treated light calcium carbonate, aluminum silicate, clay, and titanium dioxide. Among them, from the viewpoint of obtaining a cured produce with weather resistance, carbon black is preferable. The content of the filler used in the curing agent, the use amount, is preferably 0.3 to 2.0 parts by mass, and more preferably 0.5 to 1.0 parts by mass relative to 100 parts by mass of the polysulfide resin (A) in the sealing material of the present invention for multi-layered glasses, which is used as a main agent. The filler may be used either singly or in combination of two or more kinds thereof.

The plasticizer may be the same as the plasticizer that may be contained in the sealing material of the present invention for multi-layered glasses. The content of the plasticizer in the curing agent is generally 4.0 to 6.0% by weight.

Examples of the curing promoter include sulfur, guanidines, thiurams, thiazoles, sulfenamides, dithios, and water. The curing promoter may be used either singly or two or more kinds thereof may be used in combination.

Furthermore, a silane coupling agent may be also contained in the curing agent. The silane coupling agent exhibits an action of a dispersion aid for manganese dioxide. The silane coupling agent may be, for example, one usable in the sealing material of the present invention for multi-layered glasses.

After mixing the sealing material of the present invention for multi-layered glasses with a curing agent, a cured product is formed. The temperature for curing is generally 20 to 25° C. Furthermore, the time for curing is generally 24 to 168 hours.

The multi-layered glass of the present invention includes at least two glass plates opposed to each other and spaced apart via a spacer; a primary sealing material with which each lateral surface of the spacer opposed to the two glass plates is bonded to the two glass plates so that a hollow layer is formed between the two glass plates; and a cured product of a secondary sealing material with which the outer side of the primary sealing material is sealed, in which the secondary sealing material is the sealing material of the present invention for multi-layered glasses. The cured product of the secondary sealing material produced using the sealing material of the invention for multi-layered glasses has excellent gas barrier properties. Therefore, the cured product prevents gas from flowing into the intermediate layer between the two glass plates and also prevents dry air or inert gas originally present in the intermediate layer from flowing outside the intermediate layer. Furthermore, the cured product of the secondary sealing material has excellent adhesion properties to glass and is less likely to separate from glass, so that the dry air or inert gas originally present is prevented from flowing outside the intermediate layer. These advantages make it possible to provide a multi-layered glass with higher and prolonged heat insulation performance.

EXAMPLES

Hereinafter, the present invention is more specifically described on the basis of the examples. Parts and % in the examples are, except the content of the aromatic dibasic acid residue, based on mass, unless specifically described otherwise.

Synthesis Example 1 [Synthesis of the Polyester Resin (B)]

To a 2 liter 4-neck flask equipped with a thermometer, a stirrer, and a reflux condenser, 416.4 g of propylene glycol, 699.1 g of dimethyl terephthalate, 293.1 g of benzoic acid, and, as a catalyst for esterification, 0.085 g of tetraisopropyl titanate were added, and, with stirring under nitrogen stream, the temperature was gradually increased to 230° C., and they were reacted for 13 hours in total. After the reaction, unreacted propylene glycol was removed under reduced pressure at 200° C. to obtain a polyester resin (B-1) which is represented by General Formula (1-1). The polyester resin (B-1) had an acid number of 0.56, a hydroxyl number of 19.7, and a number average molecular weight (Mn) of 800. n in General Formula (1-1) of the polyester resin (B-1) was 3.0 on average, and the content of the aromatic dibasic acid residue (terephthalic acid residue) in the polyester resin (B-1) was 57% based on a chemical formula weight which is calculated from the chemical formula represented by [ ]$_N$ in General Formula (1-1).

Synthesis Example 2 (Same as Above)

To a 2 liter 4-neck flask equipped with a thermometer, a stirrer, and a reflux condenser, 451.1 g of propylene glycol, 883.5 g of dimethyl terephthalate, 158.8 g of benzoic acid, and, as a catalyst for esterification, 0.090 g of tetraisopropyl titanate were added, and, with stirring under nitrogen stream, the temperature was gradually increased to 230° C., and they were reacted for 20 hours in total. After the reaction, unreacted propylene glycol was removed under reduced pressure at 230° C. to obtain a polyester resin (B-2) which is represented by General Formula (1-1). The polyester resin (B-2) had an acid number of 1.06, a hydroxyl number of 12.9, and a number average molecular weight (Mn) of 1500. n in General Formula (1-1) of the polyester resin (B-2) was 7.0 on average, and the content of the aromatic dibasic acid residue (terephthalic acid residue) in the polyester resin (B-2) was 61% based on a chemical formula weight which is calculated from the chemical formula represented by [ ]$_N$ in General Formula (1-1).

Synthesis Example 3 (Same as Above)

To a 4-neck flask which has an internal volume of 2 liter and is equipped with a thermometer, a stirrer, and a reflux condenser, 608.0 g of propylene glycol, 830.7 g of terephthalic acid, and, as a catalyst for esterification, 0.086 g of tetraisopropyl titanate were added, and, with stirring under nitrogen stream, they were subjected to a condensation reaction for 87 hours in total by increasing gradually the temperature to 200° C. After the reaction, unreacted propylene glycol was removed under reduced pressure at 160° C. to obtain a polyester resin (B-3) which is represented by General Formula (1-1). The polyester resin (B-3) had an acid number of 0.15, a hydroxyl number of 187.8, and a number average molecular weight (Mn) of 690. n in General Formula (1-1) of the polyester resin (B-3) was 1.8 on average, and the content of the aromatic dibasic acid residue (terephthalic acid residue) in the polyester resin (B-3) was 53% based on a chemical formula weight which is calculated from the chemical formula represented by [ ]$_N$ in General Formula (1-1).

Synthesis Example 4 (Same as Above)

To a 4-neck flask which has an internal volume of 1 liter and is equipped with a thermometer, a stirrer, and a reflux condenser, 1141.4 g of propylene glycol, 970.9 g of dimethyl terephthalate, and, as a catalyst for esterification, 0.127 g of zinc acetate were added, and, with stirring under nitrogen stream, they were subjected to a condensation reaction for 16 hours in total by increasing gradually the temperature to 200° C. After the reaction, unreacted propylene glycol was removed under reduced pressure at 190° C. to obtain a polyester resin (B-4) which is represented by General Formula (1-1). The polyester resin (B-4) had an acid number of 0.82, a hydroxyl number of 156.3, and a number average molecular weight (Mn) of 940. n in General Formula (1-1) of the polyester resin (B-4) was 3.6 on average, and the content of the aromatic dibasic acid residue (terephthalic acid residue) in the polyester resin (B-4) was 58% based on a chemical formula weight which is calculated from the chemical formula represented by [ ]$_N$ in General Formula (1-1).

Synthesis Example 5 (Same as Above)

To a 4-neck flask which has an internal volume of 3 liter and is equipped with a thermometer, a stirrer, and a reflux condenser, 255.7 g of propylene glycol, 450.0 g of dimethyl terephthalate, and, as a catalyst for esterification, 0.042 g of tetraisopropyl titanate were added, and, with stirring under nitrogen stream, they were subjected to a condensation reaction for 10 hours in total by increasing gradually the temperature to 240° C. After the reaction, unreacted propylene glycol was removed under reduced pressure at 200° C. to obtain a polyester resin (B-5) which is represented by General Formula (1-1). The polyester resin (B-5) had an acid number of 0.35, a hydroxyl number of 48.8, and a number average molecular weight (Mn) of 2,100. n in General Formula (1-1) of the polyester resin (B-5) was 8.5 on average, and the content of the aromatic dibasic acid residue (terephthalic acid residue) in the polyester resin (B-5) was 61% based on a chemical formula weight which is calculated from the chemical formula represented by [ ]$_N$ in General Formula (1-1).

Synthesis Example 6 (Same as Above)

To a 4-neck flask which has an internal volume of 2 liter and is equipped with a thermometer, a stirrer, and a reflux condenser, 608.0 g of propylene glycol, 740.6 g of phthalic anhydride, and, as a catalyst for esterification, 0.081 g of tetraisopropyl titanate were added, and, with stirring under nitrogen stream, they were subjected to a condensation reaction for 26.5 hours in total by increasing gradually the temperature to 200° C. After the reaction, unreacted propylene glycol was removed under reduced pressure at 160° C. to obtain a polyester resin (B-6) which is represented by General Formula (1-1). The polyester resin (B-6) had an acid number of 0.36, a hydroxyl number of 183.1, and a number average molecular weight (Mn) of 560. n in General Formula (1-1) of the polyester resin (B-6) was 1.8 on average, and the content of the aromatic dibasic acid residue (phthalic acid residue) in the polyester resin (B-6) was 53% based on a chemical formula weight which is calculated from the chemical formula represented by [ ]$_N$ in General Formula (1-1).

Synthesis Example 7 (Same as Above)

To a 4-neck flask which has an internal volume of 3 liter and is equipped with a thermometer, a stirrer, and a reflux condenser, 1092.2 g of propylene glycol, 1481.2 g of phthalic anhydride, and, as a catalyst for esterification, 0.154 g of tetraisopropyl titanate were added, and, with stirring under nitrogen stream, they were subjected to a condensation reaction for 26 hours in total by increasing gradually the temperature to 220° C. After the reaction, unreacted propylene glycol was removed under reduced pressure at 230° C. to obtain a polyester resin (B-7) which is represented by General Formula (1-1). The polyester resin (B-7) had an acid number of 0.6, a hydroxyl number of 57.9, and a number average molecular weight (Mn) of 1,400. n in General Formula (1-1) of the polyester resin (B-7) was 5.5 on average, and the content of the aromatic dibasic acid residue (phthalic acid residue) in the polyester resin (B-7) was 60% based on a chemical formula weight which is calculated from the chemical formula represented by [ ]$_N$ in General Formula (1-1).

Synthesis Example 8 (Same as Above)

To a 4-neck flask which has an internal volume of 3 liter and is equipped with a thermometer, a stirrer, and a reflux condenser, 1092.2 g of propylene glycol, 1481.2 g of phthalic anhydride, and, as a catalyst for esterification, 0.154 g of tetraisopropyl titanate were added, and, with stirring under nitrogen stream, they were subjected to a condensation reaction for 26 hours in total by increasing gradually the temperature to 220° C. After the reaction, unreacted propylene glycol was removed under reduced pressure at 230° C. to obtain a polyester resin (B-8) which is represented by General Formula (1-1). The polyester resin (B-8) had an acid number of 0.42, a hydroxyl number of 26.9, and a number average molecular weight (Mn) of 2,400. n in General Formula (1-1) of the polyester resin (B-8) was 9.8 on average, and the content of the aromatic dibasic acid residue (phthalic acid residue) in the polyester resin (B-8) was 62% based on a chemical formula weight which is calculated from the chemical formula represented by [ ]$_N$ in General Formula (1-1).

Synthesis Example 9 (Same as Above)

To a 4-neck flask which has an internal volume of 2 liter and is equipped with a thermometer, a stirrer, and a reflux condenser, 1275 g of ethylene glycol, 1333 g of phthalic anhydride, and, as a catalyst for esterification, 0.156 g of tetraisopropyl titanate were added, and, with stirring under nitrogen stream, they were subjected to a condensation reaction for 14.5 hours in total by increasing gradually the temperature to 195° C. After the reaction, unreacted ethylene glycol was removed under reduced pressure at 160° C. to obtain a polyester resin (B-9) which is represented by General Formula (1-1). The polyester resin (B-9) had an acid number of 0.38, a hydroxyl number of 296.8, and a number average molecular weight (Mn) of 410. n in General Formula (1-1) of the polyester resin (B-9) was 0.8 on average, and the content of the aromatic dibasic acid residue (phthalic acid residue) in the polyester resin (B-9) was 49% based on a chemical formula weight which is calculated from the chemical formula represented by [ ]$_N$ in General Formula (1-1).

Synthesis Example 10 (Same as Above)

To a 4-neck flask which has an internal volume of 2 liter and is equipped with a thermometer, a stirrer, and a reflux condenser, 430.8 g of 3-methyl-1,5-pentane diol, 582.6 g of dimethyl terephthalate, and, as a catalyst for esterification, 0.061 g of tetraisopropyl titanate were added, and, with stirring under nitrogen stream, they were subjected to a condensation reaction for 15 hours in total by increasing gradually the temperature to 220° C. to obtain a polyester resin (B-10) which is represented by General Formula (1-1). The polyester resin (B-10) had an acid number of 0.16, a hydroxyl number of 61.4, and a number average molecular weight (Mn) of 2,100. n in General Formula (1-1) of the polyester resin (B-10) was 5.6 on average, and the content of the aromatic dibasic acid residue (terephthalic acid residue) in the polyester resin (B-10) was 49% based on a chemical formula weight which is calculated from the chemical formula represented by [ ]$_N$ in General Formula (1-1).

Synthesis Example 11 (Same as Above)

To a 4-neck flask which has an internal volume of 3 liter and is equipped with a thermometer, a stirrer, and a reflux condenser, 810.4 g of propylene glycol, 499.9 g of phthalic anhydride, 164.4 g of adipic acid, 1221.2 g of benzoic acid, and, as a catalyst for esterification, 0.162 g of tetraisopropyl titanate were added, and, with stirring under nitrogen stream, they were subjected to a condensation reaction for 17 hours in total by increasing gradually the temperature to 220° C. After the reaction, unreacted propylene glycol was removed under reduced pressure at 195° C. to obtain a polyester resin (B-11) which is represented by General Formula (1-1). The polyester resin (B-11) had an acid number of 0.18, a hydroxyl number of 12.5, and a number average molecular weight (Mn) of 450. n in General Formula (1-1) of the polyester resin (B-11) was 1.0 on average, and the content of the aromatic dibasic acid residue (terephthalic acid residue) in the polyester resin (B-11) was 36% based on a chemical formula weight which is calculated from the chemical formula represented by [ ]$_N$ in General Formula (1-1).

Synthesis Example 12 [Synthesis of the Polyester Resin (B') as Subject for Comparison]

To a 4-neck flask which has an internal volume of 2 liter and is equipped with a thermometer, a stirrer, and a reflux condenser, 312.8 g of propylene glycol, 261.6 g of adipic acid, 436.0 g of benzoic acid, and, as a catalyst for esterification, 0.097 g of tetraisopropyl titanate were added, and, with stirring under nitrogen stream, they were subjected to a condensation reaction for 10 hours in total by increasing gradually the temperature to 230° C. After the reaction, unreacted propylene glycol was removed under reduced pressure at 190° C. to obtain a polyester resin (B'-1) as a subject for comparison. The polyester resin (B'-1) as a subject for comparison had an acid number of 0.50, a hydroxyl number of 12.6, and a number average molecular weight (Mn) of 450.

Example 1 (Sealing Material for Multi-Layered Glasses According to the Present Invention)

According to the formulation shown in Table 1, the polysulfide resin (A), the polyester resin (B), and components other than those were admixed with one another to obtain a sealing material for multi-layered glasses (1) of the present invention. The sealing material for multi-layered glasses (1) and a curing agent with the following composition were admixed with each other at mass ratio of 10:1. Immediately after the mixing, a sheet was molded by using a press machine. The sheet was allowed to stand overnight in an environment of 55% RH at 23° C. to obtain a sheet-like cured product of a polysulfide-based sealing material having a film thickness of about 300 μm. Together with the molding of a sheet, an H type test specimen aged in an environment of 55% RH at 23° C. was produced according to the method described in JIS A 1439. Gas barrier property (nitrogen permeation property, and water vapor permeation property) was evaluated by using the sheet-like cured product, and, at the same time, an adhesion property to glass was evaluated by using the H type test specimen. The method for evaluation and criteria for evaluation are shown in the followings. The evaluation results are shown in Table 1.

<Composition of Curing Agent>
Manganese dioxide (Type FA metal oxide manufactured by Honeywell): 10 parts
Santicizer 278 (manufactured by Ferro Corporation, alkyl benzyl phthalate plasticizer represented by the following formula): 13 parts

[Chem. 11]

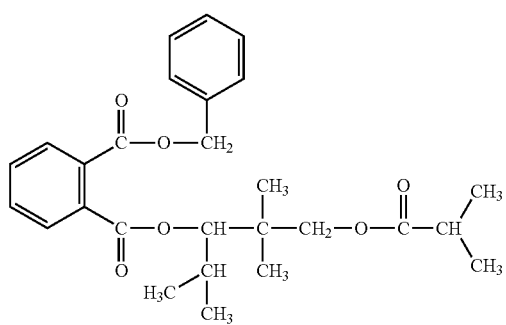

Tetramethylthiuram disulfide (curing promoter): 0.5 part
Heavy calcium carbonate (NCC #400 filler manufactured by Nitto Funka Kogyo K.K.): 5 parts
Carbon (SR-F carbon filler manufactured by Asahi Carbon Co., Ltd.): 0.5 part <Method for Evaluation of Nitrogen Permeation Property>

According to the method described in JIS-K 7126 (differential pressure method), nitrogen permeability of the sheet-like cured product was measured in an environment with temperature of 26° C. by using a tester [GTR TESTER M-C1 (manufactured by Toyo Seiki Seisaku-sho Ltd.)], and then evaluated, based on the obtained measured values (unit: cc·atm/m$^2$), according to the following criteria.
⊙: The measured value was less than 90 cc·atm/m$^2$
○: The measured value was 90 cc·atm/m$^2$ or more but less than 120 cc·atm/m$^2$
X: The measured value was 120 cc·atm/m$^2$ or more.

<Method for Evaluation of Water Vapor Permeation Property>

According to the method described in JIS Z 0208, water vapor permeability of the sheet-like cured product was measured at measurement conditions with temperature of 40° C. and relative humidity of 90%, and then evaluated, based on the obtained measured values (unit: g/m$^2$24 h), according to the following criteria. As a water vapor permeation cup, a cup with inner diameter of 30 mm and depth of 25 mm was used.
○: The measured value was less than 150 g/m$^2$24 h
X: The measured value was 150 g/m$^2$24 h or more.

<Method for Evaluation of Adhesion Property to Glass>

According to the method described in JIS A 1439, an H type tensile adhesion property test was carried out by using a glass as an adherend for test. Failure state was determined in terms of the cohesion failure (CF) ratio of a cured product of the sealing material for multi-layered glasses according to the present invention. A case in which CF was 90% or higher was evaluated as showing a good tensile adhesion property (0) while a case in which CF is lower than 90% was evaluated as showing an insufficient tensile adhesion property (X).

Example 2 to Example 11 (Same as Above)

Sealing materials for multi-layered glasses (2) to (11) of the present invention were obtained in the same manner as Example 1 except that the formulations shown in Tables 1 and 2 were used. The gas barrier property and adhesion property to glass were evaluated in the same manner as Example 1, and the results are given in Tables 1 and 2.

Comparative Examples 1 to 4 (Sealing Material for Multi-Layered Glasses as Subject for Comparison)

Sealing materials (1') to (4') for multi-layered glasses (1') for comparison were obtained in the same manner as Example 1 except that the formulation shown in Table 3 was used. The gas barrier property and adhesion property to glass were evaluated in the same manner as Example 1, and the results are given in Table 3.

TABLE 1

|  | Example | | | | | |
|---|---|---|---|---|---|---|
|  | 1 | 2 | 3 | 4 | 5 | 6 |
| Sealing material for multi-layered glass | (1) | (2) | (3) | (4) | (5) | (6) |

TABLE 1-continued

|  |  | Example | | | | | |
|---|---|---|---|---|---|---|---|
|  |  | 1 | 2 | 3 | 4 | 5 | 6 |
| Polysulfide resin (A) | Thiokol LP-23 | 100 | 100 | 100 | 100 | 100 | 100 |
|  | (B-1) | 19.25 |  |  |  |  |  |
|  | (B-2) |  | 19.25 |  |  |  |  |
|  | (B-3) |  |  | 19.25 |  |  |  |
|  | (B-4) |  |  |  | 19.25 |  |  |
|  | (B-5) |  |  |  |  | 19.25 |  |
|  | (B-6) |  |  |  |  |  | 19.25 |
| Plasticizer | PB-10 | 19.25 | 19.25 | 19.25 | 19.25 | 19.25 | 19.25 |
| Filler | Hakuenka CC | 65 | 65 | 65 | 65 | 65 | 65 |
|  | Whiton SSB Red | 90 | 90 | 90 | 90 | 90 | 90 |
| Silane coupling agent | KBM-403 | 1.5 | 1.5 | 1.5 | 1.5 | 1.5 | 1.5 |
| Nitrogen permeability | Measured value (cc · atm/m$^2$) | 89 | 78 | 69 | 65 | 62 | 88 |
|  | Evaluation | ⊙ | ⊙ | ⊙ | ⊙ | ⊙ | ⊙ |
| Water vapor permeability | Measured value (g/m$^2$ · 24 h) | 129 | 123 | — | 137 | 127 | — |
|  | Evaluation | ○ | ○ |  | ○ | ○ |  |
| Adhesion property | Evaluation | ○ | ○ | ○ | ○ | ○ | ○ |

TABLE 2

|  |  | Example | | | | |
|---|---|---|---|---|---|---|
|  |  | 7 | 8 | 9 | 10 | 11 |
| Sealing material for multi-layered glass |  | (7) | (8) | (9) | (10) | (11) |
| Polysulfide resin (A) | Thiokol LP-23 | 100 | 100 | 100 | 100 | 100 |
|  | (B-7) | 19.25 |  |  |  |  |
|  | (B-8) |  | 19.25 |  |  |  |
|  | (B-9) |  |  | 19.25 |  |  |
|  | (B-10) |  |  |  | 19.25 |  |
|  | (B-11) |  |  |  |  | 19.25 |
| Plasticizer | PB-10 | 19.25 | 19.25 | 19.25 | 19.25 | 19.25 |
| Filler | Hakuenka CC | 65 | 65 | 65 | 65 | 65 |
|  | Whiton SSB Red | 90 | 90 | 90 | 90 | 90 |
| Silane coupling agent | KBM-403 | 1.5 | 1.5 | 1.5 | 1.5 | 1.5 |
| Nitrogen permeability | Measured value (cc · atm/m$^2$) | 61 | 62 | 80 | 72 | 105 |
|  | Evaluation | ⊙ | ⊙ | ⊙ | ⊙ | ○ |
| Water vapor permeability | Measured value (g/m$^2$ · 24 h) | 134 | 132 | — | 119 | — |
|  | Evaluation | ○ | ○ |  | ○ |  |
| Adhesion property | Evaluation | ○ | ○ | ○ | ○ | ○ |

TABLE 3

|  |  | Comparative Example | | | |
|---|---|---|---|---|---|
|  |  | 1 | 2 | 3 | 4 |
| Sealing material for multi-layered glass |  | (1') | (2') | (3') | (4') |
| Polysulfide resin (A) | Thiokol LP-23 | 100 | 100 | 100 | 100 |
| Polyester resin (B') | (B'-1) | 38.5 |  |  |  |
| Plasticizer | PB-10 |  | 38.5 |  |  |
|  | BBP |  |  | 38.5 |  |
|  | W-260 |  |  |  | 38.5 |
| Filler | Hakuenka CC | 65 | 65 | 65 | 65 |
|  | Whiton SSB Red | 90 | 90 | 90 | 90 |
| Silane coupling agent | KBM-403 | 1.5 | 1.5 | 1.5 | 1.5 |
| Nitrogen permeability | Measured value (cc · atm/m$^2$) | 131 | 164 | 197 | 392 |
|  | Evaluation | X | X | X | X |
| Water vapor permeability | Measured value (g/m$^2$ · 24 h) | 175 | 171 | 176 | 339 |
|  | Evaluation | X | X | X | X |
| Adhesion property | Evaluation | ○ | ○ | ○ | ○ |

Footnotes of Tables 1 to 3

Thiokol LP-23: polysulfide resin manufactured by Toray Fine Chemicals Co., Ltd.

Average molecular weight: 2,500, viscosity: 12 (Pa·s 25° C.)

PB-10: benzoic acid-based plasticizer manufactured by DIC Corporation

Number average molecular weight: 290, content of the aromatic dibasic acid: 0%

BBP: phthalic acid-based plasticizer (butyl benzyl phthalate) manufactured by Ferro Corporation W-260: ether ester-based plasticizer manufactured by DIC Corporation Number average molecular weight: 410, content of the aromatic dibasic acid: 0%

Hakuenka CC: precipitated calcium carbonate manufactured by Shiraishi Calcium Kaisha, Ltd.

Whiton SSB Red: heavy calcium carbonate manufactured by Shiraishi Calcium Kaisha, Ltd.

KBM-403: 3-glycidoxypropyltrimethoxysilane manufactured by Shin-Etsu Chemical Co., Ltd.

-: Not evaluated

The invention claimed is:

1. A sealing material for a multi-layered glass, comprising:
   a polysulfide resin (A); and
   a polyester resin (B) which is a polyester resin represented by General Formula (1-1):

[Chem. 1]

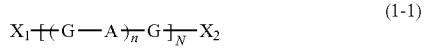

(1-1)

wherein A represents a dibasic acid residue, G represents an aliphatic diol residue having 2 to 8 carbon atoms, n represents the average number of repetitions of a repeating unit in parentheses and is a numerical value larger than 0, A and G may be the same or different between the repeating units each in the parentheses, X1 and X2 each independently represent a hydrogen atom or a group represented by General Formula (2-1):

[Chem. 2]

(2-1)

wherein R represents an aromatic group or an aliphatic group, and some or all of A's are aromatic dibasic acid residues, and which has an aromatic dibasic acid residue content of 20 to 70% on the basis of a chemical formula weight calculated from the chemical formula represented by [ ]N in General Formula (1-1) and also has a number average molecular weight (Mn) of 400 to 5,000.

2. The sealing material for a multi-layered glass according to claim 1, wherein n in General Formula (1-1) is 0.5 to 12.0 on average.

3. The sealing material for a multi-layered glass according to claim 1, wherein the polyester resin (B) has a number average molecular weight (Mn) of 400 to 2,500.

4. The sealing material for a multi-layered glass according to claim 1, wherein A is an aromatic dibasic acid residue having 8 to 14 carbon atoms.

5. The sealing material for a multi-layered glass according to claim 1, wherein A is at least one residue selected from the group consisting of a phthalic acid residue, a terephthalic acid residue, and an isophthalic acid residue;
   and wherein G is an ethylene glycol residue, a propylene glycol residue, or a 3-methylpentane diol residue.

6. The sealing material for a multi-layered glass according to claim 1, wherein each of $X_1$ and $X_2$ in General Formula (1-1) is a hydrogen atom.

7. The sealing material for a multi-layered glass according to claim 1, wherein each of $X_1$ and $X_2$ in the polyester resin represented by General Formula (1-1) is a group represented by General Formula (2-1), and R in the group represented by General Formula (2-1) is an aromatic group.

8. The sealing material for a multi-layered glass according to claim 1, wherein each of $X_3$ and $X_4$ in the polyester resin represented by General Formula (1-2) is an aliphatic group having 1 to 5 carbon atoms.

9. The sealing material for a multi-layered glass according to claim 1, wherein the polyester resin (B) has a content of 1 to 80 parts by mass relative to 100 parts by mass of the polysulfide resin (A).

10. A multi-layered glass comprising:
    at least two glass plates opposed to each other and spaced apart via a spacer;
    a primary sealing material with which each lateral surface of the spacer opposed to the two glass plates is bonded to each of the two glass plates so that a hollow layer is formed between the two glass plates; and
    a cured product of a secondary sealing material with which an outer side of the primary sealing material is sealed,
    the secondary sealing material comprising:
    a polysulfide resin (A); and
    a polyester resin (B) which is a polyester resin represented by General Formula (1-1):

[Chem. 4]

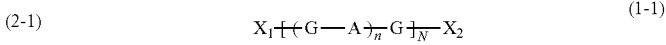

(1-1)

wherein A represents a dibasic acid residue, G represents an aliphatic diol residue having 2 to 8 carbon atoms, n represents the average number of repetitions of a repeating unit in parentheses and is a numerical value larger than 0, A and G may be the same or different between repeating units each in parentheses, $X_1$ and $X_2$ independently represent a hydrogen atom or a group represented by General Formula (2-1):

[Chem. 5]

(2-1)

wherein R represents an aromatic group or an aliphatic group, and some or all of A's are aromatic dibasic acid residues, and which has an aromatic dibasic acid residue content of 20 to 70% on the basis of a chemical formula weight calculated from the chemical formula represented by [ ]N in General Formula (1-1), and also has a number average molecular weight (Mn) of 400 to 5,000.

* * * * *